July 2, 1929.  H. MARTIN  1,719,067

MANOMETER

Filed Jan. 5, 1925  6 Sheets-Sheet 1

Fig.1.

INVENTOR
Harold Martin
BY
ATTORNEY

July 2, 1929.  H. MARTIN  1,719,067
MANOMETER
Filed Jan. 5, 1925    6 Sheets-Sheet 3

INVENTOR
Harold Martin
BY
ATTORNEY

July 2, 1929. H. MARTIN 1,719,067
MANOMETER
Filed Jan. 5, 1925 6 Sheets-Sheet 4

Fig.4.

INVENTOR
Harold Martin
BY
ATTORNEY

July 2, 1929.  H. MARTIN  1,719,067
MANOMETER
Filed Jan. 5, 1925  6 Sheets-Sheet 6

INVENTOR
Harold Martin
BY
ATTORNEY

Patented July 2, 1929.

1,719,067

UNITED STATES PATENT OFFICE.

HAROLD MARTIN, OF PORTSMOUTH, ENGLAND.

MANOMETER.

Application filed January 5, 1925, Serial No. 602, and in Great Britain January 7, 1924.

This invention refers to improvements in or relating to manometers of the electrical resistance type, in which the U-tube containing mercury or other conducting fluid has disposed within the fluid a bare resistance element, the resistance of which varies according to the extent of immersion of the said resistance wire in the said conducting fluid, the level of the conducting fluid being varied proportionately by a pressure difference device such as a Venturi or Pitot tube or the like, or by a column of fluid, to which the manometer is suitably connected.

In the specification of my prior British Letters Patent No. 3535/23, now No. 219,716, is described an apparatus of this kind for use as a petrol level indicator, the transmitting portion being, however, preferably connected outside the tank, the depth of the liquid inside of which is to be measured.

The object of the present invention is to provide a manometer of the above-described kind, but of modified construction which is specially suitable for use as a tide gauge indicator or as a depth indicator for tanks, more particularly those of considerable depth, and in which it is desirable to immerse or place inside the tank the transmitting portion of the apparatus. This improved apparatus has been primarily designed for the measurement of depths of water or oil contained in the tanks of ships, especially submarine, in which it is necessary to place the transmitter inside the tank.

Now according to the present invention I provide a manometer of the type described, in which one leg of the U-tube is connected at its upper end to another depending tube forming therewith an inverted U-tube, the lower end of which tube projects into a fluid-containing chamber to form a seal between the actuating fluid and the mercury.

In order that the present invention may be clearly understood and more readily carried into effect, it is hereinafter described with reference to the accompanying drawings, in which:—

In carrying the present invention into effect, I provide in one of the legs of the U-tube, a resistance coil which is immersed more or less in a column of mercury, which is adapted to rise and fall in proportion to the depth of water or other liquid in the tank in which the U-tube is placed. The variations in resistance of the resistance coil are measured by means of a ratio coil indicator as in the case of the above-mentioned prior Letters Patent.

Figure 5:
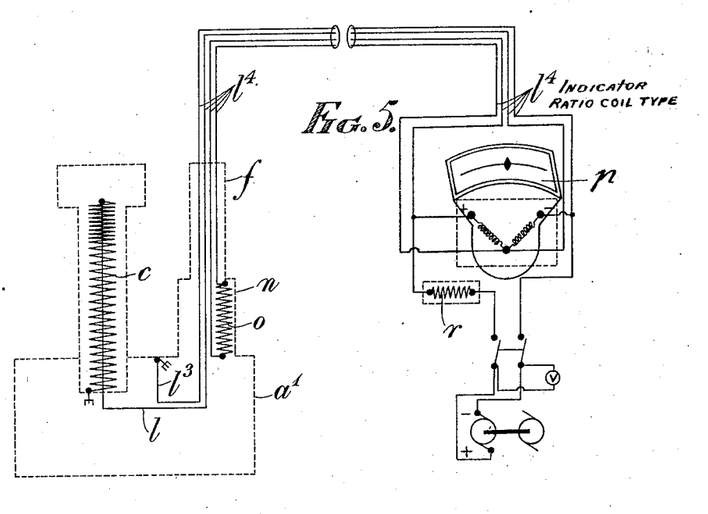
Figure 5 is a diagram of connections of the combined tank depth transmitter and indicating apparatus illustrating the apparatus as in Figure 1 with the fixed resistance coil at the transmitter and showing a four-wire interconnecting cable.
Figure 6:
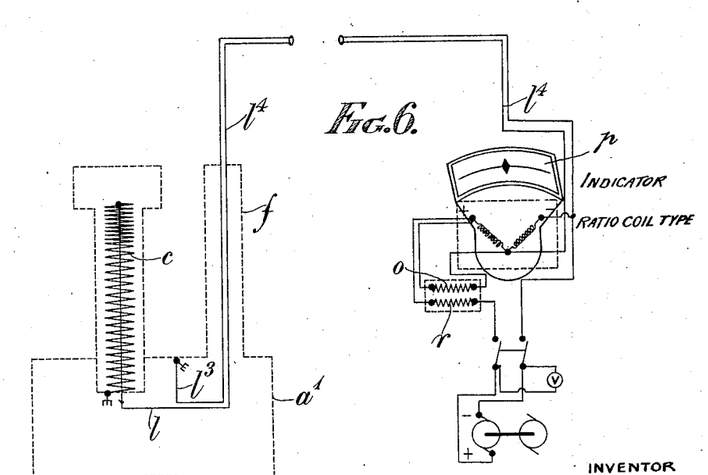
Figure 6 is a diagram of connections of the combined tank depth transmitter and indicating apparatus showing the arrangement corresponding to Figure 4, that is, with the fixed resistance coil adjacent to the supply generator at the indicator and a two-core inter-connecting cable.

As shown and according to the present invention the U-tube transmitter preferably consists of a U-tube $a, a'$ formed by means of a relatively shallow covered cast iron chamber $a'$ containing mercury $b$, passing through the centre of the cover $a^2$ of which is a steel tube $a$ of relatively small diameter in which the varying resistance coil $c$ is suitably arranged upon an insulated former $d$. Owing to the fact that the transmitter is fixed at the bottom and inside the tank $e$ (Fig. 3) the depth of which has to be measured, a stand-pipe $f$ is connected to the cover $a^2$ of the mercury chamber $a'$, and is carried up to the top of the tank $e$ where it terminates in an open vessel or catch pot $g$ of relatively large diameter. The rising steel tube $a$ of the U-tube containing the varying resistance coil $c$ terminates in one branch of an inverted U-shaped casting $a^3$ to the other branch of which is connected at its upper end another steel tube $a^4$, which also connects at its lower end to another small cast iron chamber $a^5$ into which it projects so as to form a seal for the liquid $h$ (preferably oil) which is normally contained in it. The upper portion of the last-mentioned sealing chamber $a^5$ is exposed to the liquid $i$ in the tank in which it is immersed by means of a plug-hole $j$ in its cover which is normally left open. The lengths of the steel tubes $a$, $a^4$ together with the varying resistance coil $c$ contained in the one $a$, depend upon the maximum depth of the tank $e$ which is to be measured. In the centre of the upper inverted U-shaped casting $a^3$ is fitted a metal plug $k$ which can be withdrawn in order that the transmitter can be filled with oil as necessary before being put in operation. The steel tube $a^4$ terminating in the lower sealing chamber $a^5$, and which, when in operation, contains only oil and water, also projects into the upper inverted U-shaped casting $a^3$. The lower mercury chamber $a'$ is normally fitted with a steel plug $a^6$ (see Fig. 4) at such a height as to indicate by overflow when the correct quantity of mercury has been placed in the apparatus with the plug withdrawn. The resistance coil $c$ is supported upon the insulated former $d$ which is preferably formed of glazed porcelain and which in practice is found to prevent filming and retention of mercury by surface tension and capillary effects. The lower end of the varying resistance coil $c$ always dips into the mercury $b$ which is contained in the mercury chamber $a'$, and the upper end is electrically connected, as at $c'$, to one wire of a suitably insulated cable $l$ which passes up through a hole $m$ in the centre of the insulated former $d$. Inside an extension of the lower mercury chamber $a'$ (which extension consists of a mild steel container $n$) is provided a fixed resistance coil $o$ of suitable dimensions which is insulated so as to withstand permanent immersion in salt water. The two ends of this coil $o$ are connected to two wires $l'$, $l^2$ of a four-wire rubber-covered cable $l^4$, which passes between the transmitter and the indicating instrument through the standpipe $f$ from the upper end of which it projects. The other two wires $l$ and $l^3$ of this cable $l^4$ at the transmitter end connect one $l$, as stated, to the upper end of the varying resistance coil $c$ through the hole $m$ in the centre of its former $d$, and the other to the mercury $b$ by means of a suitable connection (not shown) to the mercury chamber. The ratio coil indicator $p$ is connected at the other end of the four-wire cable $l^4$, the correct two wires of which are also extended to a suitable source of electric supply such as a low-voltage generator or battery. This ratio coil indicator may be regarded as similar in principle and construction to those already described and illustrated in the application of my prior patent specifications Nos. 164,828 and 219,716. With reference to the other electrical apparatus shown in the diagrams at the right hand side of Figures 5, 6 and 8, in Figures 5 and 6 a small motor generator is shown supplying the tank depth indicator apparatus through a double pole switch and series resistance $r$ in each case, a voltmeter being connected across the supply side of the double pole switch, which voltmeter is marked $v$. The series resistance is primarily for the purpose of moderating the otherwise relatively large current variations through the main operating circuit, including the transmitter, owing to the fact that, when the tank is full the variable resistance $c$ is all in circuit, whereas when the tank is empty, the major portion of this resistance is short-circuited by the mercury, thus tending to produce a considerable increase in the main circuit current mentioned above, which relative increase is, however, reduced by means of the resistance in series with the supply as shown. Most of the above remarks also apply to Figure 8, but in this case supply is taken direct from suitable adjacent supply mains. The reason that a suitable electrical isolating device, such as a motor generator, is recommended for use, as in Figures 5 and 6, is that, owing to the transmitters being immersed (in the particular case described,) in salt water, the electrical supply to each apparatus is thereby grounded. Such grounding, however, cannot be permitted on the supply mains of a vessel such as a submarine. With reference to the steam flow meter, however, as the transmitter is not immersed, and is not in fact necessarily grounded, the supply is taken from adjacent mains. If, however, the transmitter in such a case was grounded on account of the interconnecting pipes to the boiler, an isolated supply similar to that shown in Figures 5 and 6 would be recommended, or in the case of alternating current supply, would be effected by means of a suitable small transformer.

Figure 1:
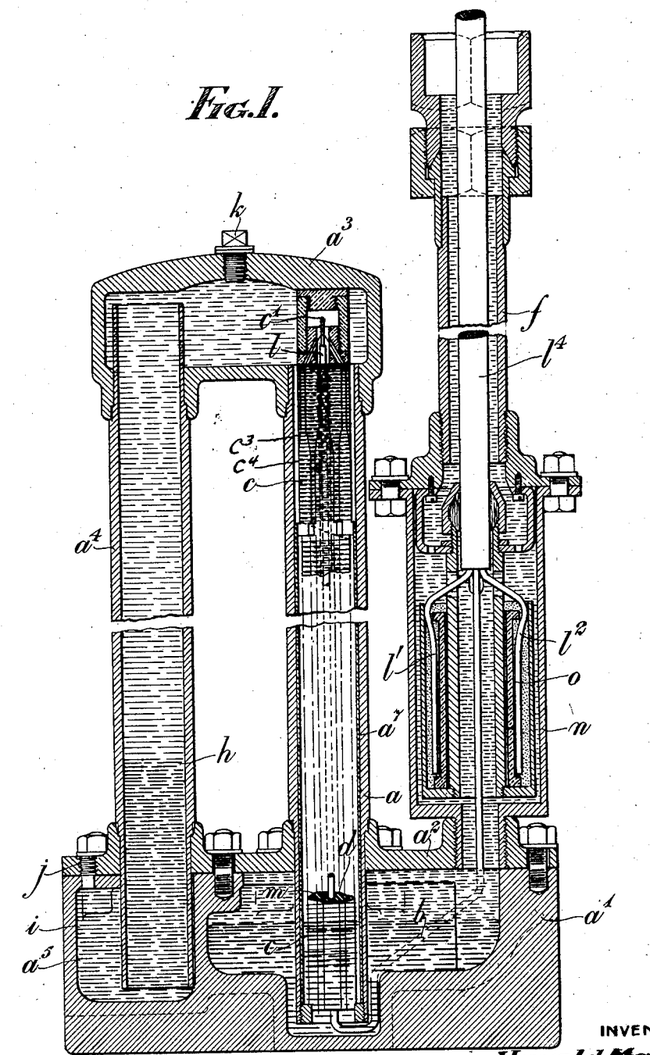
Figure 1 is a sectional side elevation of the transmitter portion of a tank depth indicator constructed in accordance with the present invention and including a fixed resistance coil.
Figure 2:
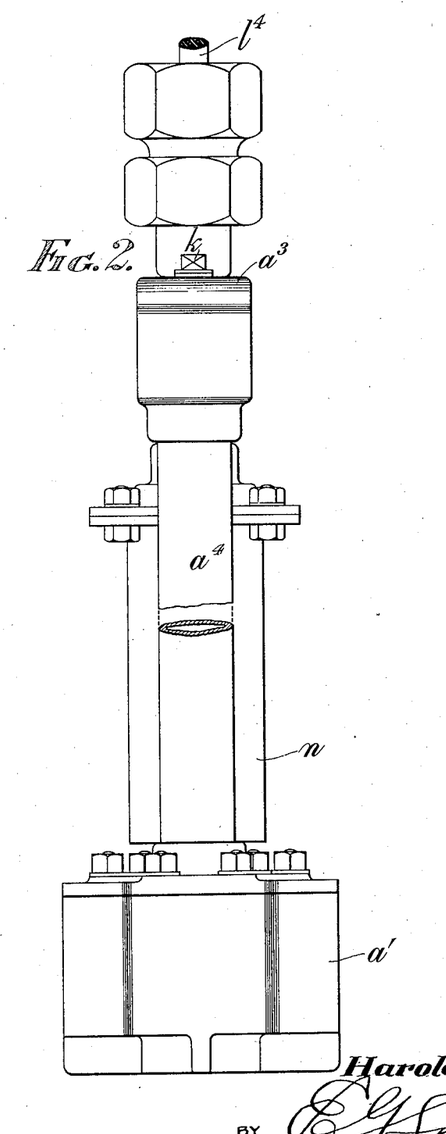
Figure 2 is a general end elevation of said apparatus.

In practice, after filling the mercury chamber $a'$ to the desired level with mercury $b$, the plug $a^6$ in this chamber $a'$ is replaced, and a plug is fitted temporarily in the hole or vent $j$ in the cover $a^2$ in the oil-sealing chamber $a^5$. The transmitter is then filled up with suitable oil, indicated at $h$, through the top plug hole $k$ of the top casting $a^3$, care being taken to eliminate all air from inside the transmitter. The fitting of the top plug $k$ seals the oil $h$ in the transmitter so that it is retained even after the removal of the temporary plug from the hole $j$ in the lower sealing chamber $a^5$, which is thus connected to the tank $e$. The standpipe $f$ is next filled with water or other liquid generally similar to that which is contained in the tank $e$, the depth of which has to be measured. Assuming that the tank $e$ is empty at the time of filling the transmitter, the effect of filling up the standpipe $f$ and the catch pot $g$ at its upper end is to exert hydraulic pressure upon the mercury $b$ in the mercury chamber $a'$ which causes the mercury to rise considerably inside the central tube $a$ containing the varying resistance coil $c$. In so doing, the mercury $b$ short circuits a considerable portion of the varying resistance coil $c$, with the result that the pointer of the indicating instrument $p$ swings over to one end of the scale, thus indicating that the tank $e$ is empty. The varying and fixed resistance coils $c$ and $o$ respectively are so arranged with due regard to the design of the indicating instrument, that the last-mentioned deflection of the pointer is accurately obtained at one end of the scale of the indicator. Upon filling the tank $e$ a hydraulic pressure is exerted through the hole $j$ in a sealing chamber $a^5$ in opposition to that produced by the liquid in the standpipe $f$, so that the mercury is gradually forced down the central tube $a$ until when the tank $e$ is full up to the level of the liquid in the standpipe $f$, the mercury in the tube $a$ is approximately back at the original level indicated, that is to say, level with the mercury in the sealing chamber. At this stage, the resistance of the varying coil $c$ is obviously increased to its maximum amount, with the result that the pointer of the indicator $p$ is moved to the opposite end of the scale indicating that the tank $e$ is full.

It is generally preferable to provide an insulating liner $a^7$ for the steel tube $a$ containing the variable resistance $c$, in order to prevent any possibility of globules of mercury being retained between the resistance coil $c$ and the tube $a$ in such a manner as to cause a short circuit and in order to reduce variation in contact resistance which would otherwise occur between the mercury and the steel tube $a$.

It should be noted that one advantage of the immersion of the transmitter in the liquid the depth of which has to be indicated, is that, in the case of the inside of the tank $e$ being subject to high fluid pressure, such pressures are equalized, as far as the inside and outside of the transmitter are concerned, so that the transmitter need not be constructed to withstand them.

Figure 7:
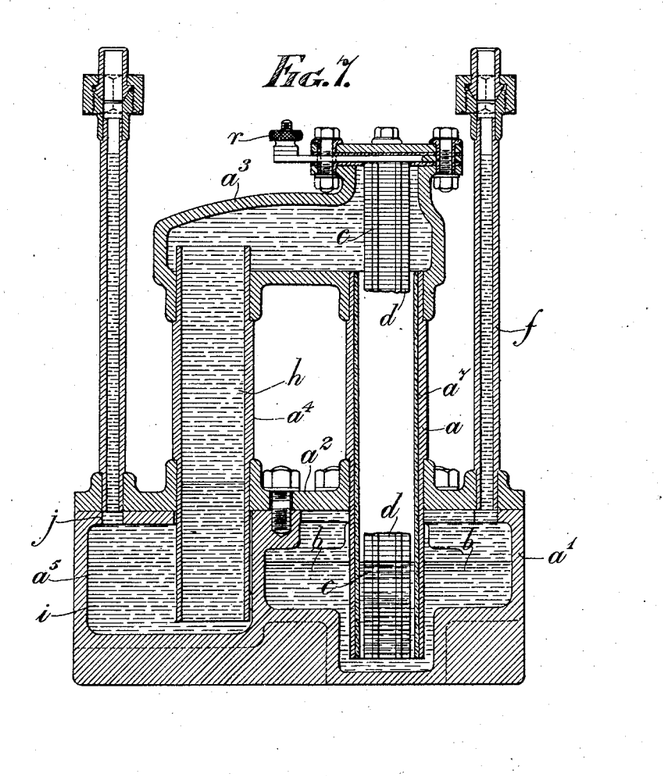
Figure 7 is a sectional side elevation showing an alternative arrangement of the transmitter portion of the apparatus adapted as a steam-flow indicator.

As shown in Figure 7 an apparatus of very similar design can be satisfactorily used as a flow indicator, but as in this case the transmitter would be connected across an orifice plate, Pitot tube, or the like, inserted in the pipe, the flow of fluid in which it is desired to measure, the standpipe necessary for use with the above-described tank depth indicator would not be required, its place being taken by the high pressure connection $f$. Furthermore, in a transmitter for use in such flow measurement, it would be preferable to bring the electrical connections, such as the terminal $r$, out through the top inverted U-shaped casting $a^3$ by means of suitably insulated glands or plates, which must be designed to withstand without risk of leakage the full pressure to which the instrument is likely to be subjected. In this construction the low pressure connection is made to the plug-hole $j$ so that in this case also the instrument works as before through the sealing pipe $a^4$.

Figure 4:
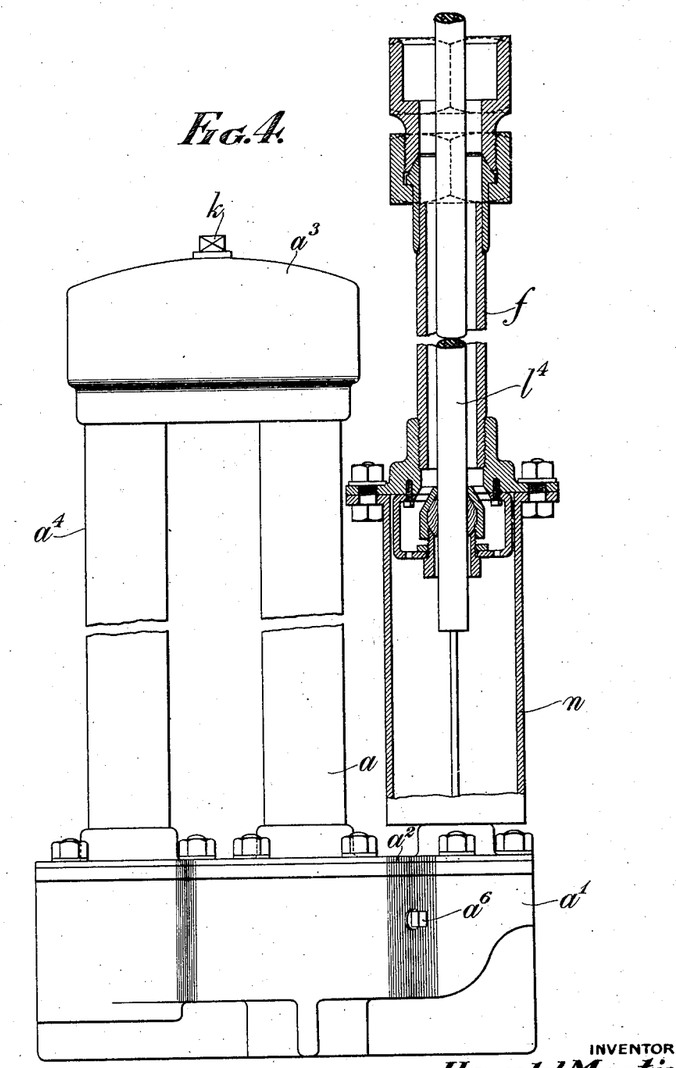
Figure 4 is a similar view to Figure 1 illustrating a slightly modified construction of apparatus in which the fixed resistance coil is arranged at the indicator portion of the apparatus.

It will be noted that one advantage of having the fixed coils away from the transmitter, such as in the case of a submarine, as is illustrated in Figures 4 and 6, is that the adjustment of the fixed coil can be readily made from the inside of the submarine, in order to effect the calibration or correction of the indicating instrument without it being necessary to obtain access to the transmitter which is placed in the bottom of the tank. Another advantage with this arrangement is that it is only necessary to run a two-wire cable between the transmitter and the indicating apparatus instead of the four-wire cable required with the arrangement shown in Figure 1. Further, if desired, the two-wire cable can be reduced to a single wire connection by utilizing a satisfactory and reliable ground return. This advantage as regards economy will be found to be most manifest in the case of land installations where the transmitter and indicator may be a considerable distance—perhaps some miles—apart. Still further advantages are that the construction of the transmitter itself becomes less complicated and the whole apparatus more reliable, the latter owing to the fact that the resistance coil is inside the submarine instead of being continuously submerged in salt water.

Referring to the construction illustrated in Figure 1, it will be observed that the variable resistance coil $c$ consists of two coils $c^3$ and $c^4$ wound in parallel; that is to say, on a double-pitch screw-thread, the coils being connected together at the upper end. The main advantage of this arrangement is that the ratio of the contact surface of the variable coil which is exposed to the mercury, relative to the total resistance of the coil, is considerably increased, thereby reducing errors due to variation in contact resistance. This ratio can, of course, be further increased if desired by winding more than two coils in parallel. It is also found convenient to arrange the resistance coil on the former with wider spaces at the lower portion than at the upper portion, as indicated. This ensures the proper minimum spacing at the lower end of the coil where the mercury contact is obtained to prevent retention of globules of mercury between the turns, and also enables the desired amount of wire to be wound on a former of reasonable dimensions.

Figures 3, 8:
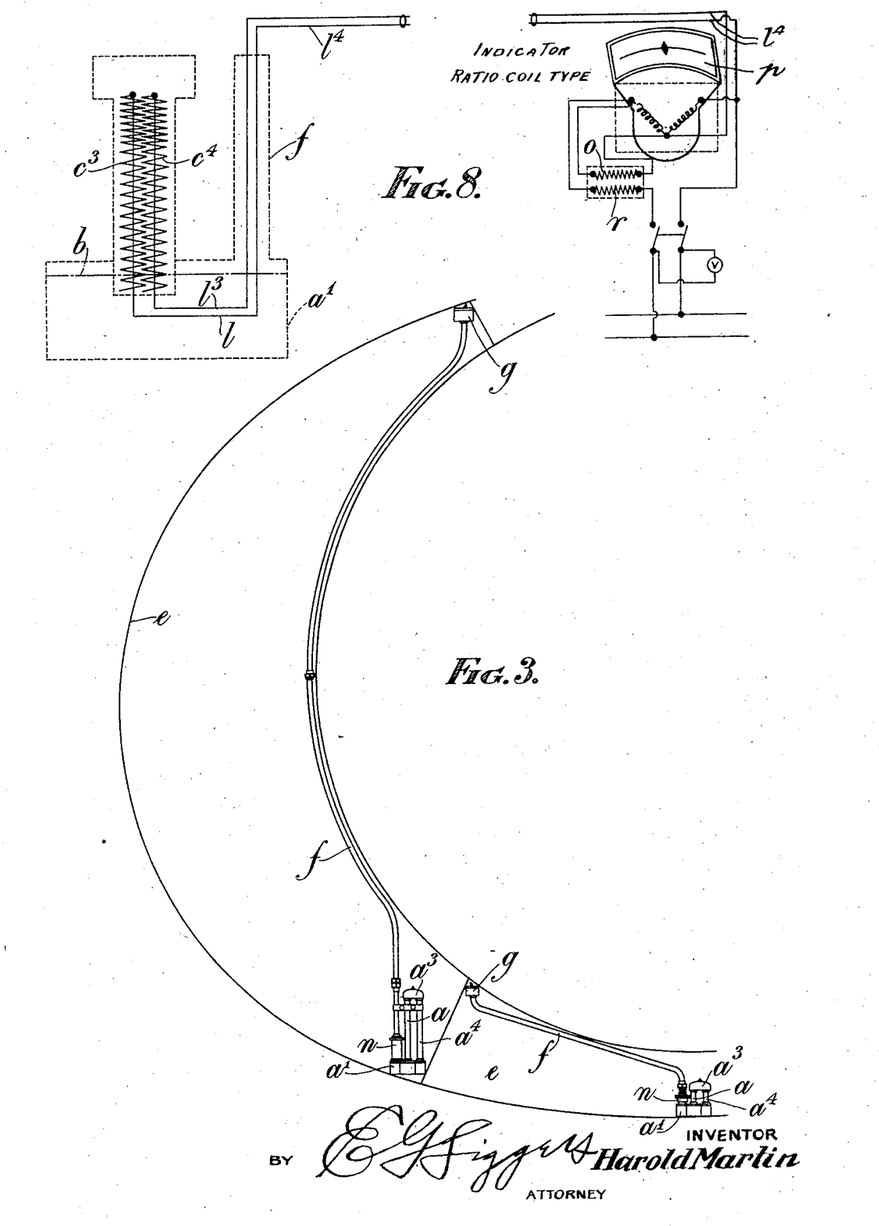
Figure 3 is a diagrammatical view of a compensating tank and a buoyancy tank of a submarine and illustrating the application of the present invention to each of said tanks.
Figure 8 is a diagram of the connections of the combined tank depth transmitter and indicating apparatus adapted for use with alternating current supply.

It will undoubtedly frequently be necessary to use alternating current supply in connection with this apparatus, owing primarily to the facilities which alternating current presents for transformation, as, in transforming alternating current, not only can a suitable supply voltage readily be obtained without installing rotating plant, but the secondary winding being completely isolated from the primary, provides a ready and simple means of isolating the ground connection (which would normally be encountered with the tank depth indicator apparatus) from the actual supply mains. There is no difficulty regarding the construction of suitable indicating instruments for the receiving end, but the construction of the transmitter presents some difficulty with alternating current supply, owing to the fact that inductive effects would be produced by the concentric steel tube $a$ and the adjacent iron castings. It is therefore proposed in such cases to arrange and connect the variable resistance winding $c^3$ $c^4$ which makes contact with the mercury, as shown in Figure 8 of the drawings. It will be noted, that with the same double winding as hitherto proposed and used, instead of one wire only of the cable being connected to both the upper ends at the common point $c'$, the return connection being obtained by means of contact through the mercury and frame of the transmitter, it is proposed to carry both the insulating wires $l$ $l^3$ of the interconnecting cables $l^4$ up through the centre of the variable resistance former $d$, and to connect them independently to the upper ends of the two parts $c^3$ and $c^4$ of the variable resistance winding as shown. In operation therefore with this arrangement, the mercury $b$ would merely act as a coupling between the two insulated windings $c^3$ $c^4$, and not as a portion of the return circuit as formerly proposed. With this arrangement, using alternating current supply, it will be noted that, owing to the arrangement and connection of the winding of the former $d$, when alternating current is passing, inductive effects will be almost entirely neutralized at the transmitter, due to the fact that the flow of the current both in the two parts $c^3$ $c^4$ of the resistance winding and in the interconnecting leads $l^4$ will always be in opposite directions, that is to say, the transmitter is wound and connected non-inductively for the purpose of alternating current supply. Further, owing to the action of the mercury as a coupling rather than as a portion of the return circuit, it has been found, as the result of actual test, that contact resistance errors are minimized. Also the construction in question would in general appear to make the provision of an insulating liner for the central tube unnecessary and there will be less error due to variation in resistance produced by the tipping over of the transmitter at an angle, (as if rigidly connected on board ship) with the improved construction in question. It should be observed that the non-inductively wound and connected variable coil construction would appear to be equally applicable to equivalent apparatus of either the fluid flow or level indicating types. It would, however, necessitate in the case of the fluid flow or equivalent transmitter construction, the bringing out of two insulated leads through the cap situated above the central tube containing the variable resistance coil.

What I claim is:—

1. A manometer adapted to be submerged in a fluid to be measured comprising in combination, an inverted U-tube; and a chamber adapted to contain fluid and open to one leg of the U-tube, and also having an opening to permit pressure from the fluid without the manometer to be transmitted to the fluid in the chamber; a resistance coil in the other leg of the U-tube; an electric circuit connected with the resistance coil; a second chamber adapted to contain a metallic fluid and open to the last mentioned leg of the U tube and means to put a permanent and predetermined amount of pressure on the fluid in the second chamber to cause it to rise in that leg which contains the resistance coil.

2. A manometer according to claim 1, in which a standpipe is provided having its lower end open to the second chamber in which the fluid is maintained, so that the pressure of fluid within the standpipe may act on the fluid within the second chamber to cause it to rise in one leg of the U-tube.

3. A manometer adapted to be submerged in a fluid to be measured, comprising in combination, an inverted U-tube; a chamber adapted to contain fluid in which the lower end of one leg of the inverted U tube is immersed, and also having an opening in its top to permit pressure from the fluid without the manometer to be transmitted to the fluid in said chambers; a resistance coil in the other leg of the inverted U tube; an electric circuit connected with the resistance coil; a second chamber adapted to contain a metallic fluid into which the lower end of the second mentioned leg of the tube is immersed; a standpipe having its lower end open to the second chamber and adapted to contain a fluid which is supported on the metallic fluid in the second chamber, said standpipe being disposed in the fluid to be measured and having a height greater than the depth of said fluid so that its upper end is above the surface of the fluid.

4. A manometer according to claim 1, in which a resistance element is connected in the electric circuit in series, for the purpose of moderating the relatively large current variations of the circuit due to cutting in and cutting out of the resistance coil in the U-tube.

5. A manometer according to claim 1, in which the variable resistance element comprises a plurality of coils wound like a multiple thread around an insulating core, so that the surface of the coil which is exposed is considerably increased, thereby reducing errors due to variation in contact resistance.

6. A manometer adapted to be submerged in the fluid to be measured, comprising in combination a casing having two chambers; an inverted U tube having the lower end of each of its legs extending downwardly into one of the chambers and terminating near the bottoms thereof; one of the chambers being partially filled with a metallic fluid which is a good conductor of electricity and which extends upwardly into the corresponding leg of the tube to partially fill the same; a resistance coil in said leg; the second chamber, the second leg of the tube, the connecting portion of the tube and remainder of the space in the first tube above the metallic fluid, being filled with a non-metallic fluid; said second chamber having an opening in its upper end to permit pressure from the fluid without the manometer to be transmitted to the fluid in said chamber; a standpipe having its lower end open to the first chamber, said standpipe and remainder of the space above the metallic fluid in the first chamber being filled with a non-metallic fluid; and an electric circuit connected with the resistance coil.

In testimony whereof I have hereunto signed my name.

HAROLD MARTIN.